July 4, 1944. H. D. GEYER 2,352,784
FLUID SEAL
Filed July 30, 1942
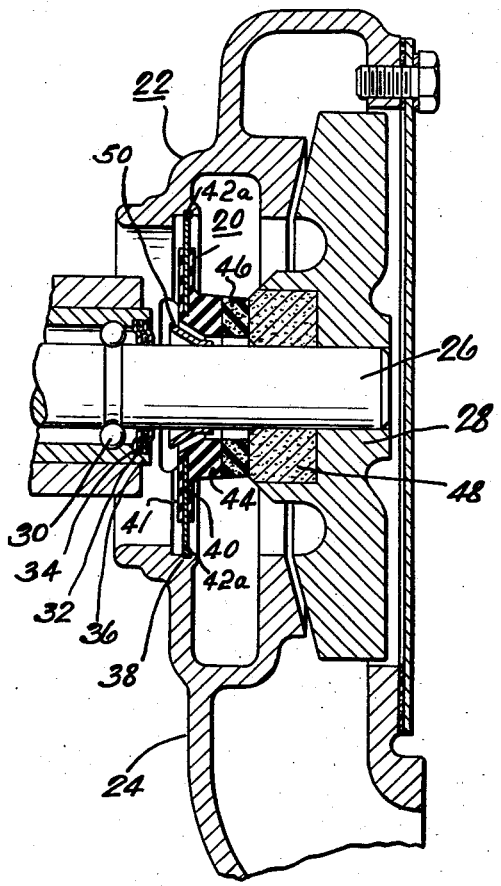
Fig. 1.
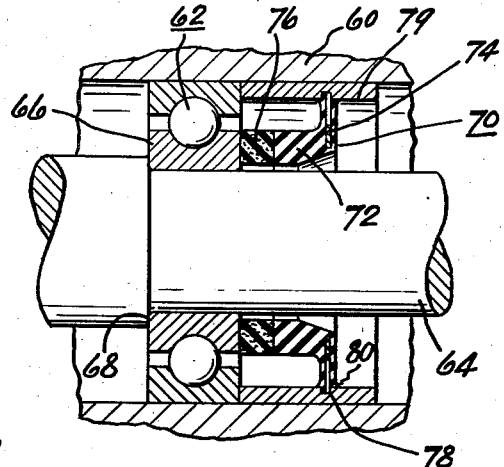
Fig. 2.
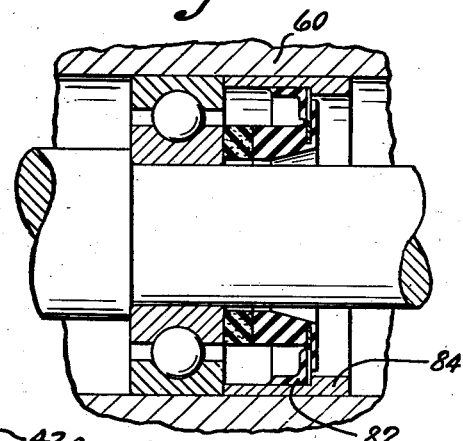
Fig. 3.
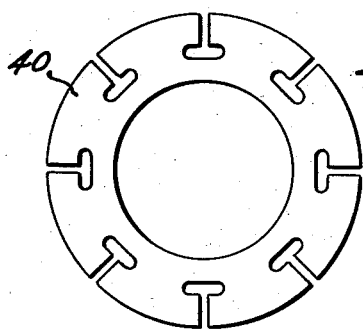
Fig. 4.
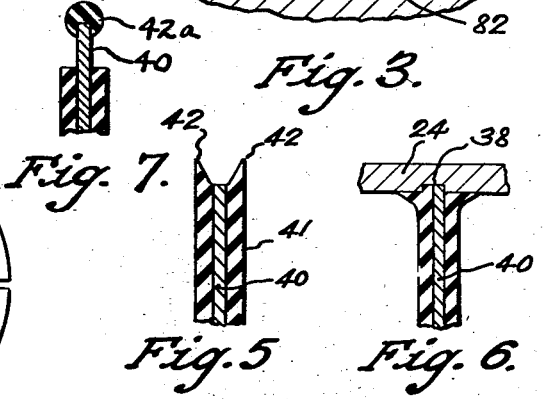
Fig. 5. Fig. 6.
Fig. 7.
INVENTORS
HARVEY D. GEYER
BY
THEIR ATTORNEYS Patented July 4, 1944

2,352,784

UNITED STATES PATENT OFFICE 2,352,784

FLUID SEAL

Harvey D. Geyer, Dayton, Ohio, assignor to General Motors Corporation, Detroit, Mich., a corporation of Delaware Application July 30, 1942, Serial No. 452,846

1 Claim. (Cl. 286—11)

This invention relates to fluid seals and is particularly concerned with fluid seals used for sealing water pumps, bearings and the like.

An object of the invention is to provide a fluid seal for use in sealing water pumps and the like which due to its construction is of very short length and thereby permits reduction in length of the water pump.

A further object of the invention is to provide a fluid seal of the diaphragm type which includes resilient means for providing sealing pressure between the parts thereof.

In carrying out the above object it is a further object to provide a fluid seal which incorporates a "Belleville" spring therein which spring is covered with a rubberlike material for preventing corrosion and for providing a sealing pressure.

A still further object is to provide a fluid seal of the type described wherein a circumferential lip or lips of rubberlike material are provided which lip or lips are flexed when the "Belleville" spring is in place, such flexing providing sealed resilient joints which prevent the flow of fluid therethrough.

Further objects and advantages of the present invention will be apparent from the following description, reference being had to the accompanying drawing wherein preferred embodiments of the present invention are clearly shown.

In the drawing:

Fig. 1 is an illustration of a water pump in section showing one type of fluid sealing device described herein;

Fig. 2 is a view in section of another embodiment of the sealing device using a grease seal in connection with ball bearings;

Fig. 3 shows another embodiment of the invention also using a grease seal in connection with ball bearings;

Fig. 4 is a plan view of one type of "Belleville" spring;

Fig. 5 is a fragmentary view in section and on an enlarged scale showing the sealing lips provided on the rubberlike member which surrounds the "Belleville" spring;

Fig. 6 is a fragmentary view in section on an enlarged scale showing the sealing action of said lips when the seal is in place; and Fig. 7 is a fragmentary view in section of another embodiment of the sealing member to be used in connection with the spring.

Fluid seals of the self adjusting type are well known. One of the most common types of such seals is a bronze or rubber-like bellows which encloses a spring and includes a sealing washer. When a rubberlike bellows is used it may be fabricated from rubber, DuPrene, polymerized isoprene or other synthetic rubbers and the like. These prior seals operate in a satisfactory manner but due to the bellows arrangement require considerable axial length in order to make a satisfactory installation. In many cases, the space required for such seals is not available and therefore redesign of the parts to receive the seal is necessary and in connection with automotive power plants such redesign entails considerable changes within the chassis construction. It has always been desirable to reduce the length of the seals of the types herein described and this invention is particularly directed to a seal which is substantially of the diaphragm type but functions in a most satisfactory manner and which may be used to completely replace the bellows type seal. Also my improved seal, being of such short length, can be incorporated in ball bearing installations as a grease seal and yields very satisfactory results due to its self-adjusting nature.

One of the embodiments of the seal is shown in Fig. 1 wherein a seal 20 is applied to an automotive water pump 22. Pump 22 includes a housing member 24, a shaft 26, an impeller 28 and bearing for the shaft 26 which bearing is pressed into a portion of the housing 24. The bearing 30, as shown in Fig. 1, includes an old style grease seal 32 which merely consists of a pair of brass cups 34 having a layer of felt or rawhide 36 interposed therebetween which resilient layer bears against the shaft and holds the grease in the bearing. The housing 24 also includes a circumferential groove 38 therearound which is adapted to receive the fluid seal 20. The seal 20 includes a "Belleville" type spring 40, one of such springs being shown in Fig. 4. Belleville springs in general are well known in the art and consist of a platelike spring generally having radial serrations therein to provide a number of spring fingers. Springs of this type when gripped on the outside periphery thereof are bulged in either direction at the axis thereof and when pressure is applied adjacent the center portion it is resiliently resisted by the springlike action of the spring. The term "Belleville spring" will be hereinafter directed to springs of this character. The spring 40 is partially covered with a layer of rubberlike material 41, which may be of any of the usual rubber or synthetic rubbers, and which is preferably molded onto the spring 40. When the "Belleville" spring 40 is snapped into the groove 38, which may be of slightly less diameter than the spring, the bead 42a seals against the housing 24, as shown in Fig. 7. By having the groove of less diameter than the spring, the spring is dished outwardly whereby a sealing pressure may be obtained although this dishing effect is not necessary if the dimensions of the parts to be sealed are predetermined, since the spring will act properly if held in a single plane. In a modified embodiment the groove 38, as shown in Fig. 6, may be slightly wider than the spring 40 so that some of the rubberlike material also fills the groove to provide an additional seal. However, in practice it has been found that an adequate seal will be obtained even if the groove is substantially the same width as the thickness of the spring 40. The important factor being that the lips 42 are provided and are flexed as shown.

The rubberlike portion 41 includes an outwardly extending face portion 44 which seals against a sealing washer 46, made from carbon, self lubricating metal, such as a porous bronze, or plastic material having metal powder incorporated therein as described in Patent #2,263,178 assigned to the assignee of the present invention. Sealing washer 46 bears against an insert 48 in the impeller 28 which insert 48 is preferably steel having a polished face to run against the sealing washer 46. In some instances the impeller 28 may be formed from suitable material so that the surface thereof may be machined thereby eliminating the insert. The distance between the "Belleville" spring 40 and the sealing face of the insert 48 is less than the dimensions of the sealing washer 46 and the face portion 44 of the rubberlike member 41. Therefore, the "Belleville" spring provides sealing pressures between the rubberlike member and the sealing washer and between the sealing washer and the impeller sealing surface. Thus a very compact seal is provided which is self adjusting for wear and for any end play within the shaft.

A conical throwing device 50 may be provided on shaft 26 for throwing any leakage through the seal away from the bearing. This leakage may occur just after the seal is installed and prior to the time that the sealing washer is run in against the sealing surface after which the seal functions properly.

Fig. 2 shows a similar type of seal applied to a ball bearing. In this instance a housing 60 is machined to receive a ball bearing 62 which is pressed upon a shaft 64. The ball bearing 62 includes a rotatable portion 66 which bears against a shoulder 68 on the shaft. The seal 70 includes a rubberlike member 72 and a "Belleville" spring 74 together with a sealing washer 76 which is interposed between the rubberlike member 72 and the rotatable portion of the ball bearing assembly 66. A circumferential groove 78 is provided in a tubular member 79 which is a press fit in the housing 60 and this groove receives the "Belleville" spring. The rubberlike member 72 includes lips 80 thereon for sealing against the member 79. Here again the assembly is so dimensioned that the "Belleville" spring 74 provides a sealing pressure for the sealing washer.

Fig. 3 shows still another embodiment which is substantially identical with the construction of the seal shown in Fig. 2 with the exception that the sealing lips are eliminated and a section of the rubber 82 is molded to the "Belleville" spring, said rubber section being of sufficient length to bend into right angle formation and form a seal with the member 84. The member 84 carries the seal and is pressed into the main housing 60 after assembly of the ball bearings therein. This construction is substantially similar to the previous construction in operation although slightly different in form.

In all embodiments the rubberlike members hold the sealing washer against rotation due to friction while the sealing washer slides easily over the metal sealing surface. It is apparent that the sealing washer may be molded onto the rubberlike member if desired as described in Patent 2,227,304 assigned to the assignee of the present invention, either construction yielding satisfactory results.

In each embodiment the seal is self adjusting for a limited distance as determined by the extent of the flexing of the "Belleville" spring. Obviously the wear on parts of this type is very slight, since in the case of water pumps the sealing surfaces are water lubricated while in the case of ball bearing seals adequate grease is present to lubricate the parts at all times.

While the embodiments of the present invention as herein disclosed, constitute preferred forms, it is to be understood that other forms might be adopted, all coming within the scope of the claim which follows:

What is claimed is as follows:

In combination with two relatively rotatable parts, a fluid seal comprising in combination: a circular plate-like spring, a rubberlike sealing member molded over a substantial portion of said spring and terminating so as to expose a peripherial annular portion of the spring, an annular bead of rubberlike material molded to the peripheral edge of said spring and having a circular shape in cross section, one of said relatively rotatable parts including a circumferential groove therearound adapted to receive said rubberlike bead for forming a resilient grip on the spring and simultaneously forming a fluid seal with the spring and the housing, and a sealing washer interposed between said rubberlike member and said other rotatable part and being of such dimensions as to flex said spring for causing the spring to exert a sealing pressure between said rubberlike member and the sealing washer and between the sealing washer and the other relatively rotatable part.

HARVEY D. GEYER.